United States Patent Office 3,441,636
Patented Apr. 29, 1969

3,441,636
MANUFACTURE OF SHAPED REFRACTORIES FROM DOLOMITE
Josef Wuhrer and Klaus Wiensz, Wulfrath, Germany, assignors to Dolomit-Werke G.m.b.H., Wulfrath, Germany, a corporation of Germany
No Drawing. Filed Apr. 19, 1968, Ser. No. 722,568
Claims priority, application Germany, Apr. 20, 1967, D 52,854
Int. Cl. C04b 35/62
U.S. Cl. 264—65                      5 Claims

ABSTRACT OF THE DISCLOSURE

The properties of lime-containing refractories are improved by adding to the burned refractory magnesium carbonate and heating the mixture under conditions where the magnesium carbonate is decomposed and the liberated carbon dioxide is taken up by the free lime.

---

This invention relates to the production of refractory shapes from burnt or sintered dolomite and more particularly to the production of such shapes which have a high cold compressive strength and do not require the so-called second firing.

It is known to make refractory shapes from burned or sintered dolomite where dolomite of a suitable grain size, sometimes with addition of a lubricant, is compressed and the pressed body is then sintered at a temperature above 1500° C. In this way, shaped bodies are obtained whose grains are sintered with each other and present a so-called ceramic bond.

In a copending application where one of the applicants is a coinventor (Ser. No. 628,293, filed Apr. 4, 1967), a method has been disclosed to prepare refractory shapes on the basis of dolomite which shapes have a cold compressive strength of at least 200 kp./cm.$^2$ and good storability in air. Said method comprises crushing burned dolomite and compressing grains of suitable size gradation under a pressure of at least 300 kp./cm.$^2$ to shaped bodies. Said bodies are treated at 450 to 800° C. with gaseous carbon dioxide, or gases containing the same, until they contain at least 0.6 percent by weight of carbon dioxide; subsequently, the thus treated bodies are dipped into tar or pitch, or in tarry or pitch-like materials, having a softening point of not more than 40° C.

A drawback of said method is that it requires relatively long reaction times for large and thick blocks; in such blocks which may have a volume up to 1 m.$^3$ for use in linings for steel melting furnaces, it takes a long time to obtain a sufficient solidification by superficial carbonation also in the inside.

In accordance with the invention, the carbon dioxide for the carbonation of the calcium oxide is at least partially supplied by mixing the starting materials, prior to their shaping, with magnesium carbonate; subsequently, the mixture is compacted and heated to a temperature below the decomposition temperature of calcium carbonate, whereupon the obtained shaped body is dipped in tar, pitch-containing tar, or pitch.

The magnesium carbonate for the supply of the carbon dioxide may be crude magnesite or also precipitated magnesium carbonate or basic magnesium carbonate, in granulated fine grained or also in finely powdered form. The magnesium oxide remaining after decomposition is also a refractory.

Said magnesium oxide is not obtained in the sintered state so that larger amounts would involve the risk of undesirable shrinkage when the shaped bodies are used as linings. Therefore, the addition of magnesium carbonate should not exceed 10 percent by weight of the refractory starting material. The lower limit is about 1%.

In order to generate the carbon dioxide used for the recarbonation of the calcium oxide, the compacted shaped bodies are subjected to a temperature which must be at least 350° C. but should not exceed 550° C. because at such high temperatures the decomposition of the magnesium carbonate would proceed so fast that only a small portion of the liberated carbon dioxide could be bound by the calcium oxide. On low decomposition of the magnesium carbonate, substantially the entire $CO_2$ is bound to the surface of the CaO so as to increase the strength of the shaped body.

It is, of course, also possible to assist said strength increase by an additional treatment with gaseous carbon dioxide introduced from the outside, which treatment may be carried out under pressure.

Subsequently to the $CO_2$ absorption, the shaped bodies are allowed to cool and then dipped in tar, pitch-containing tar, pitch or similar organic carbonaceous products, particularly those which are obtained in the coal and crude oil distillation. This treatment may be carried out under elevated pressures or in vacuo to produce good impregnation. It has been found that the strength increase of the bonded shapes is higher when tars or pitches of the coal distillation are used than when products of the naphtha distillation such as asphalt or bitumen are employed. If the impregnating bath has an excessive viscosity it is of advantage to heat the bath.

The refractory starting material consists, in the conventional grain sizings or ranges of grain sizes, of burned or sintered or even molten dolomite and/or lime to which burned or sintered or also molten magnesite may have been added. Thereby, an excess of the magnesite component may be present. In this case, however, it is of advantage to use for the magnesite a coarser grain and for the dolomite and/or lime a finer grain size.

The following example is given to illustrate but not to limit the invention.

EXAMPLE

Dolomite, sintered in a rotary kiln, bulk density 1750 g./liter measured for the sizing 5–12 mm., was broken to the following sizes in weight percent.

| Mm.: | Percent |
|---|---|
| 0–1.5 | 25 |
| 0.3–3 | 20 |
| 1.5–3 | 30 |
| 3–5 | 25 |

To said sizing, there were admixed 8 percent by weight of raw magnesite of the size range 0–2 mm. The mix was pressed under a pressure of 800 kp./cm.$^2$ to shaped bodies of 40·40·40 cm. Said bodies were then heated in four steps to 450° C. and then dipped into steel works tar which was heated to 140° C.

While the compressive strength of the pressed body was only about 15 kp./cm.$^2$, it had risen after the heat treatment to 50 kp./cm.$^2$, and the tar bonded bodies had a compressive strength of 320 kp./cm.$^2$. The storability of the latter in air was more than 6 months.

A test of the heated bodies for $CO_2$ content showed this content in the inside and in the outer zone to be between 2 and 2.5%, i.e., approximately equal.

It is intended to distribute magnesium carbonate to the utmost possible degree inside the brick, in order to achieve best distribution of the developed carbon dioxide during the heating period, therefore the magnesium carbonate should be used in a finely divided form, that is a particle-size below 5 mm., preferably a size range from 2–0 mm.

It may be of advantage for special purposes to use magnesium carbonate in a finely powdered or precipitated form, because this material is more reactive in recarbonation of calcium oxide.

We claim:

1. A method for the manufacture of refractory shapes of high cold compressive strength from grains comprising a starting material selected from the group consisting of calcined, sintered, and molten dolomite, lime, and magnesia, said method comprising admixing to said starting material a magnesium carbonate, compressing the obtained mix under a pressure of at least 300 kp./cm.$^2$, heating said compressed bodies to a temperature below the decomposition temperature of calcium carbonate but above the decomposition temperature of said magnesium carbonate until said lime of the starting material has absorbed at least 0.3 percent by weight of carbon dioxide, and subsequently impregnating said bodies with a bonding substance selected from the group consisting of tars and pitches.

2. The method as claimed in claim 1 comprising passing carbon dioxide from the outside over said compressed bodies while they are heated.

3. The method as claimed in claim 1 wherein said compressed bodies are heated at a temperature above 350° C. but not higher than 550° C.

4. The method as claimed in claim 1 wherein said magnesium carbonate is added in an amount of 1 to 10 percent by weight of said starting material.

5. The method as claimed in claim 1 wherein said magnesium carbonate is added in finely divided form.

References Cited

UNITED STATES PATENTS

| 2,567,077 | 9/1951 | Moon | 106—61 |
| 2,656,279 | 10/1953 | Heuer | 106—58 |

FOREIGN PATENTS

| 160,553 | 7/1941 | Germany. |

JULIUS FROME, *Primary Examiner.*

J. H. MILLER, *Assistant Examiner.*

U.S. Cl. X.R.

264—66; 106—58, 61